May 4, 1926. 1,583,628
M. VULLIERME
COUPLING AND ENTRAINING DEVICE FORMING A SPEED REGULATOR
Filed August 31, 1922 2 Sheets-Sheet 1
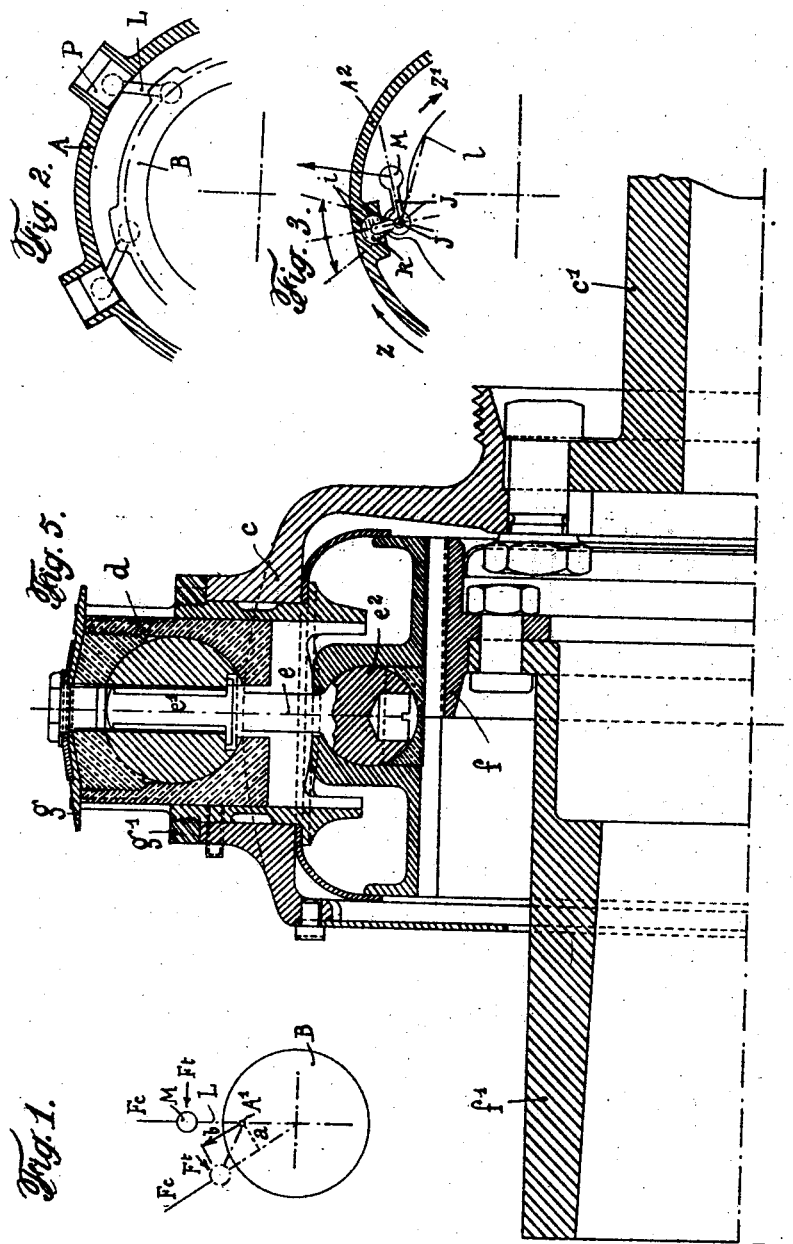
INVENTOR
Marcel Vullierme
BY Mauro, Cameron, Lewis & Kerkam
ATTORNEYS

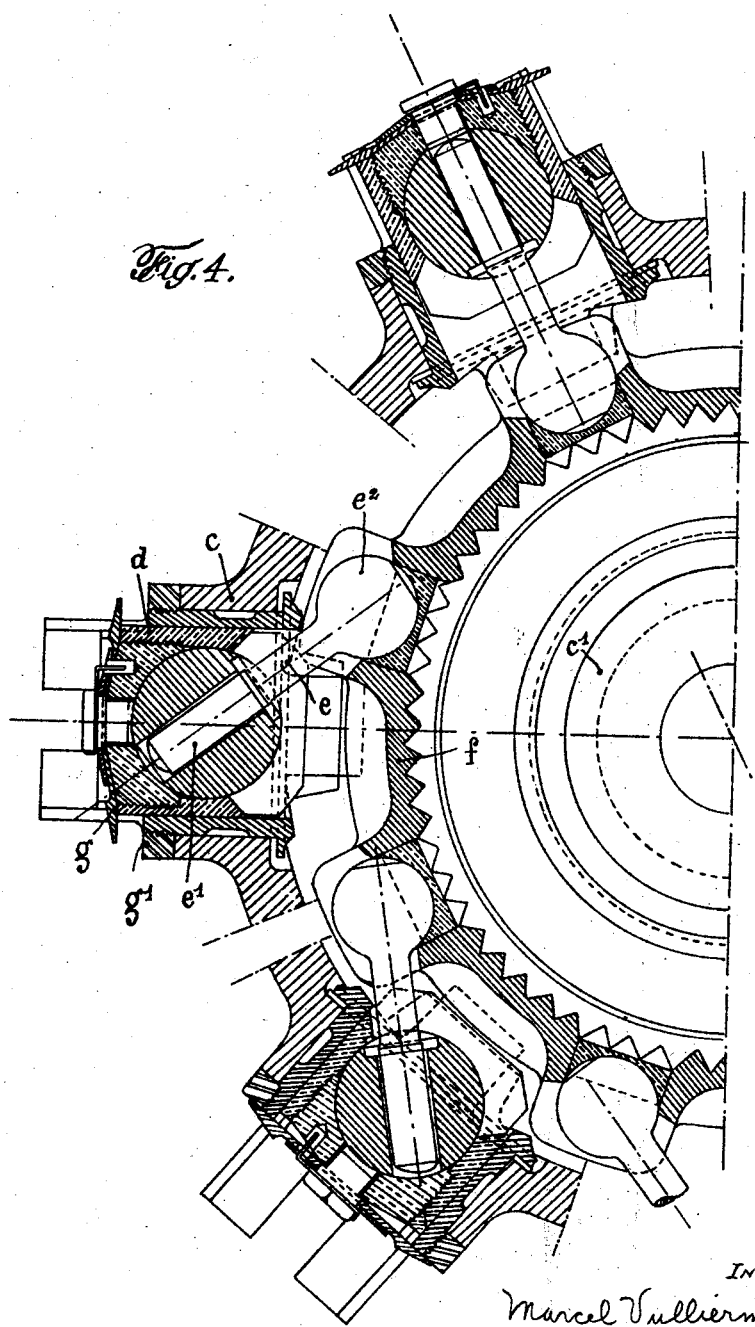

Patented May 4, 1926.

1,583,628

UNITED STATES PATENT OFFICE.

MARCEL VULLIERME, OF VELIZY-VILLACOUBLAY, FRANCE.

COUPLING AND ENTRAINING DEVICE FORMING A SPEED REGULATOR.

Application filed August 31, 1922. Serial No. 585,489.

*To all whom it may concern:*

Be it known that I, MARCEL VULLIERME, a citizen of France, and a resident of Velizy-Villacoublay, Seine-et-Oise, France, have invented new and useful Improvements in Coupling and Entraining Devices Forming Speed Regulators, which is fully set forth in the following specification.

In an engine in which the curve of the torque has the period $$\frac{2\pi}{k}$$

($k$ being the frequency) a flywheel is required in order to regularize the torque transmitted to the actuated device. The flywheel absorbs energy, when the torque is greater than the resistance couple, by increasing its speed, and it restores this energy when the torque falls below the resistance couple, thus diminishing in speed.

The energy stored up by the flywheel is equal to $A = I\omega_m(\omega_1 - \omega_0)$, I being the moment of inertia of the flywheel, and $\omega_m$ the mean angular speed, $\omega_1$ and $\omega_0$ being respectively the maximum and minimum speeds. The speed variation $$(\omega_1 - \omega_0) = \frac{A}{I\omega_m}$$

is proportional to the work to be absorbed and inversely proportional to the inertia of the flywheel, that is, it depends upon its mass. Should the flywheel be reduced to the parts having a rotary motion, the speed variations will increase, and the amplitude will be inversely proportional to their mass. The actuated device will follow these variations if it has a small inertia; should it have a large inertia, its speed will be substantially constant, and the speed variations of the engine will cause accelerations whose resultant forces, proportional to the masses and to the accelerations, and having short periods, will in the case of rigid coupling give rise to additional stresses in the transmission elements such as piston rods, crankshaft, coupling, and hub of the propeller. These forces, whose period is for example 1/120 second, for an internal combustion engine of the 8-cylinder type rotating at 1800 revolutions per minute, will change in direction every 1/240 second, and in the case of the connection between the propeller and its support which is not sufficiently tight, this may occasion the slipping of the propeller hub upon its clamping discs, which will dampen the speed variations but will absorb work. This loss of inertia is manifested by a rise of temperature due to the low conductivity of the wood and the deterioration of the hub and the fastening bolts.

If instead of the rigid coupling between the engine and the actuated device, use is made of an intermediate element containing gear wheels, the latter will be submitted to forces of acceleration of a given period and amplitude. Since the gear wheel which is keyed to the actuated device having a large inertia has practically no speed variations, the gear teeth will be subject to a very considerable hammering, and if the play between the teeth is smaller than the space which the freely oscillating engine device tends to cover, this rapid hammering will occur alternately upon each side of the teeth and will cause the rapid wear of the same.

The present invention relates to a speed-regulating coupling which obviates these drawbacks, admitting the free variation of the engine speed. According to the invention, the coupling between the driving shaft whose speed is instantaneously variable and the driving shaft at constant speed (or vice versa) is effected through the intermediary of masses which are connected by a pivot joint to one of the shafts and actuate the other shaft—or are actuated thereby—by a centrifugal action.

The invention further relates to a form of construction of a regulator, as well as the application of its principle to the construction of an entraining device with multiple keys which excludes all possible play.

The following description, together with the accompanying drawings which are given by way of example, set forth this invention.

Fig. 1 is a diagrammatic view showing the operation of the device. Fig. 2 is a like view showing the regulating coupling, and Fig. 3 a like view representing the entraining devices with multiple keys. Fig. 4 is a half cross-section of a form of construction of a coupling device according to the invention, and Fig. 5 is an axial section of said device.

The principle of the invention is shown diagrammatically in Fig. 1. A mass M is secured to the end of a lever arm L whereof the other end is pivoted at $A^1$ to a disc B. If the whole device rotates at a speed $\omega$, the mass will have a centrifugal force $F^c$ proportional to $\omega^2$ and equal to $m\omega^2 R$, wherein R is the distance between the mass and the centre of rotation. Should a force $F^t$ be exerted upon the mass M, the latter will be inclined in the direction of the force $F^t$, but the radial centrifugal force, by reason of the inclination of lever arm L to the radius, will give rise to a couple, and the mass M will continue to incline until it affords a lever arm $a$ whereof the couple $F^c a$ equilibrates the force $F^t b$, wherein $b$ is the lever arm of the force $F^t$ having $A'$ as a pivot.

It may be supposed that the force $F^t$ is produced by a driving shaft and that the mass M slides loosely in a cylindrical recess provided in a ring surrounding the disc B, said ring being rotated directly by the engine. When the force $F^t$ varies, for example during a momentary failure of the engine, the mass M will swing in order to afford a lever arm producing a couple which equilibrates that of the new tangential force. During the rapid variations which are caused by the successive positive and negative accelerations due to speed variations of the driving couple, the mass will in all cases bear against the force $F^t$ and will thus eliminate the shocks occasioned by these rapid alternations. In fact, when the acceleration is positive, $F^t$ increases, and the mass M will descend in its recess in order to increase the couple, as is necessary for the equilibrium. Should $F^t$ decrease on account of a negative acceleration, the mass will now rise, but without losing contact with the force $F^t$, since the component of the centrifugal acceleration for the speeds under consideration is greater than the negative acceleration produced by the engine.

This principle has been applied to the construction of the regulator which is represented diagrammatically in Fig. 2.

An outer drum A which is keyed to the end of the engine crankshaft carries on the periphery various cylinders co-operating with the pistons P constituting masses. Said pistons are connected by the rods L, ending in ballbearing parts, with a disc B mounted on the intermediate shaft driving the propeller. The drum A provides for the actuating of the masses and produces the tangential force. The masses are calculated so as to balance the driving couple at the minimum speed, and a stop-piece determines their end positions. The amplitude of the oscillation may be such that the couple shall vary from its positive maximum to a negative couple of equal value, this variation taking place by passing through a couple of zero-value, that is, without shock.

This provides for a speed-regulating coupling which admits all variations in the instantaneous speed of the engine, and transmits, without shocks, a constant speed to an actuated device having a great inertia. The construction of the device represents at the same time the Oldham joint by the relative displacement of the outer and inner rings, and the Cardan joint by the use of the ball-socket joints of the rods which admit an angle between the axes of the engine and the actuated device.

A practical form of construction of the regulator, which is particularly applicable to an aviation engine, is shown in Figs. 4 and 5. In the actuating drum $c$ which is mounted on the crankshaft $c^1$, Fig. 5, are provided the recesses or cylinders for the pistons $d$, Fig. 4, connected by a rod $e$ with the ring $f$ secured to the hub of the propeller $f^1$, Fig. 5, and whereof the speed of rotation is substantially constant. The rods $e$ are connected by ball-and-socket joints at one end $e^1$ to piston $d$ and at the other end at $e^2$ to the ring $f$. A convex washer $g$ secured to the piston comes into contact with the face $g^1$ of the cylinders provided in the drum $c$ in order to limit the inward stroke of the pistons.

The said regulator serves to reduce in an engine the volume of the elements having a rotary motion and to give to the latter the minimum size required by the stresses to be supported which are now reduced inasmuch as the inertia of the whole device is diminished. This will accordingly increase the speed, power and plant efficiency of the engine. The said regulator also provides for the use of aviation engines having a smaller number of cylinders than the known engines, and such engines with reduced number of cylinders will have speed variations whose amplitude is greater as the number of cylinders becomes smaller and as the parts in rotation have a smaller mass, for example, engines with radial cylinders.

The forces of acceleration are such as to produce considerable additional stresses, and in spite of the rigid mounting of the engine on the propeller, there is produced a slipping of the latter upon its holding devices which causes a rapid deterioration of the hub. These drawbacks are obviated by the free variation in speed of the engine as admitted by the regulator according to the invention.

Fig. 3 shows in diagram an application of the principle of the regulator to the construction of an entraining device with multiple keys while preventing all play. An outer ring $A^2$, which receives the movement, is provided with the circular grooves $i$. The rods $j$ are bent at a right angle, and one end of the same is provided with the mass M; the other end engages a socket $k$ inserted into the circular groove $i$ of the ring $A^2$.

The elbow of said rod $j$ is in each case pivoted by the axle $j^1$ to an actuated disc $l$.

The operation of said device is as follows:

The outer ring $A^2$ is actuated in the sense of the arrow Z Fig. 3. The masses are calculated so as to obtain the equilibrium at the minimum speed. The variations in speed of the ring $A^2$ are free, and inasmuch as the components of the centrifugal accelerations on the masses M are greater than the variations in tangential acceleration which act upon the other arm of said rods $j$, the wheel $l$ is always drawn in the sense of the arrow $Z^1$, Fig. 3, and therefore the wheel $l$ will in all cases bear upon the same faces of the gear wheels with which it is for example engaged. This will eliminate the jarring at the gear teeth and the consequent wear at those points.

Obviously, the said device may be modified in detail without departing from the principle of the invention.

What I claim is:

1. A speed-regulating coupling connecting two shafts, comprising an external ring connected with one of said shafts, an internal ring connected with the other of said shafts, heavy masses slidable radially in said external ring by centrifugal force, and links having pivotal connections with said masses and with said internal ring.

2. In a speed-regulating coupling for connecting a driving shaft having an instantaneously variable speed with a shaft having a constant speed, the combination with said driving shaft, of a drum provided with radially disposed piston cylinders, pistons in said cylinders constituting inertia elements, and rods connecting with said elements having jointed connections with said driven shaft whereby said inertia elements under relative angular displacement of said shafts automatically maintain constant speed in said driven shaft.

3. In a speed-regulating coupling as defined in claim 2, wherein means are provided for limiting the down strokes of said pistons.

4. In a speed-regulating coupling for connecting a driving shaft having instantaneously variable speeds with a shaft having constant speed, the combination of a driving shaft provided with a drum having radial piston cylinders, pistons in said cylinders, rods having ball and socket connections with said pistons and having flexible connections with said driven shaft, abutments on said pistons to limit their downward strokes, said pistons constituting inertia elements for transmitting constant speed to said driven shaft.

In testimony whereof I have signed this specification.

MARCEL VULLIERME.